(12) United States Patent
Clark

(10) Patent No.: US 9,274,814 B2
(45) Date of Patent: Mar. 1, 2016

(54) ENHANCED HOOK FUNCTION FOR USE WITH DIFFERENT VERSIONS OF A DYNAMICALLY LOADED LIBRARY

(71) Applicant: VMware, Inc., Palo Alto, CA (US)

(72) Inventor: Jonathan Clark, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/618,220

(22) Filed: Feb. 10, 2015

(65) Prior Publication Data

US 2015/0154037 A1    Jun. 4, 2015

Related U.S. Application Data

(63) Continuation of application No. 14/088,359, filed on Nov. 23, 2013, now Pat. No. 8,978,053, which is a continuation of application No. 11/381,715, filed on May 4, 2006, now abandoned.

(51) Int. Cl.

| | | |
|---|---|---|
| G06F 3/00 | (2006.01) | |
| G06F 9/44 | (2006.01) | |
| G06F 9/46 | (2006.01) | |
| G06F 13/00 | (2006.01) | |
| G06F 9/445 | (2006.01) | |

(52) U.S. Cl.
CPC ........ *G06F 9/44536* (2013.01); *G06F 9/44521* (2013.01); *G06F 9/4425* (2013.01)

(58) Field of Classification Search
CPC .................................................. G06F 9/44536

USPC .......................................................... 719/331
See application file for complete search history.

(56) References Cited

U.S. PATENT DOCUMENTS

| | | | |
|---|---|---|---|
| 5,946,486 A * | 8/1999 | Pekowski | 717/128 |
| 5,974,470 A * | 10/1999 | Hammond | 719/331 |
| 6,253,257 B1 | 6/2001 | Dundon | |
| 6,259,985 B1 | 7/2001 | Sielagosk et al. | |
| 6,779,179 B1 | 8/2004 | Romm et al. | |
| 6,874,149 B1 | 3/2005 | Bermudez et al. | |
| 6,959,441 B2 | 10/2005 | Moore | |
| 2007/0261044 A1 | 11/2007 | Clark | |

OTHER PUBLICATIONS

Hall et al., "A Virtual Operating System", 1980, ACM, vol. 23, No. 9, pp. 495-502.
Cambridge, "C++ templates", 2004, University of Cambridge Department of Engineering, pp. 1-3.
Harris, Tom, "How to File Compression Works", 2002, archive.org, pp. 1-5.

* cited by examiner

*Primary Examiner* — Timothy A Mudrick

(57) ABSTRACT

A hooking system for hooking predetermined references to predetermined dynamically loaded library (DLL) functions includes a DLL version identifier provided by a hook entry code to an enhanced hook. The hook entry code is dynamically generated during runtime of an affected software application. The version identifier enables unambiguous communication of a single enhanced hook with functions of multiple versions of identically named DLLs loaded into the same isolated process memory area.

17 Claims, 8 Drawing Sheets

ENHANCED HOOK FUNCTION FOR USE WITH DIFFERENT VERSIONS OF A DYNAMICALLY LOADED LIBRARY

CLAIM OF PRIORITY

This application is a continuation of and claims priority to U.S. patent application Ser. No. 14/088,359, entitled "Enhanced Hook Function for Use with Different Versions of a Dynamically Loaded Library", filed on Nov. 23, 2013, which also is a continuation of and claims priority to U.S. patent application Ser. No. 11/381,715, entitled "Chained Hook Function Serving Multiple Versions of Identically Named Dynamically Loaded Libraries", filed on May 4, 2006, the content of both of which are incorporated herein by reference in their entireties for all purposes.

FIELD OF INVENTION

The present invention relates to hook functions for runtime interception and redirection of a function call in a code executing computing environment. In particular, the present invention relates to a single hook function intercepting and redirecting function calls to multiple versions of a distinct dynamically loaded library (DLL).

BACKGROUND OF INVENTION

A code executing computing environment commonly referred to as system may include among other components an operating system, applications, and dynamically loaded libraries (DLLs) as are well known in the art. A number of functions commonly combined within standardized interfaces contribute to the system's overall behavior. To alter the behavior of a system functions such as for file input-output, prior art applications may reroute execution through well known hook functions or plainly called hooks. In a conventional hook, an application may invoke an original DLL function by utilizing the standardized interfaces.

Prior to and during code execution of an application, modifications are made to insert hooks between an application and DLL functions in order to allow for dynamic runtime changes to the application without source code modifications of applications and/or system. Hooks may pass execution to the original DLL function with same or alternated parameters and then return filtered or unfiltered results to the application after executing said DLL function. DLLs are continuously improved necessitating ongoing updating. Applications undergo an evolutionary process that may be independent of the related DLLs' evolution. To keep applications compatible with ever modifying systems, multiple versions of DLLs with identical name are kept accessible to applications. Unambiguous interaction between applications and identically named DLLs has been recently facilitated by technologies such as well known Microsoft Windows™ Side-by-side™ DLL loading. It causes even more identically named DLLs being loaded into isolated process memory area.

The inventor observed occasional and somewhat unpredictable failure of prior art hooks and discovered that such prior art hook failure was related to hooks directing execution to incorrect destination addresses when multiple versions of identically named DLLs were simultaneously loaded into well known isolated process memory areas. This is rooted in the fact that a particular application version may require functions embedded in distinct versions of an identically named DLL in order to execute in a predetermined manner inside a particular system version. In the case where updated versions of identically named functions having different functionality exist in several identically named DLLs, prior art hooks may eventually access and execute the wrong function. An error may result and/or may be detected only, if such ambiguously accessed functions differ in functionality to the extent, that the overlying application execution is adversely and/or noticeable effected. In praxis and at time this problem was discovered, occurrence may be estimated without claim for accuracy of less than one out of ten thousand implemented hooks. Irrespective such rare occurrence, this problem needs to be addressed for reliable implementation of hooks. Therefore, there exists a need for an improved hook function to be used with multiple target functions embedded in a number of identically named final destinations such as dynamically loaded libraries of distinct version. The present invention addresses this need.

SUMMARY

A method is introduced for applying an enhanced hook to a reference referencing a predetermined function of a dynamically loaded library (DLL) loaded into an isolated process memory area by an executing software application. The method includes a first step of attempting to identify a relevant reference referencing a relevant function to be hooked. Relevant reference and relevant function are predetermined. In case a relevant reference is identified during the first step, a second step takes places during which distinct hook entry code is dynamically generated for the relevant function referenced by the identified relevant reference. Also during the second step and following the dynamic hook entry code generation, the relevant reference is replaced with the hook entry code such that a consecutive invocation to said relevant function executes the hook entry code. In a following third step, a version identifier is provided by the hook entry code. The version identifier is received and interpreted in an enhanced hook specifically configured for interpreting the version identifier. Consequently, the enhanced hook unambiguously identifies the correct DLL irrespective an eventual other identically named version of that DLL loaded into the same isolated process memory area.

Identification of relevant references may be attempted during an initial screening of the DLLs initially loaded at execution begin of the software application. Identification of relevant references may also be attempted during a continuous screening of DLLs loaded at runtime of the software application. In case a relevant reference is identified, hook entry code is dynamically generated. The dynamically generated hook entry code includes generated CPU instructions, which perform the following operations. In a first step, a return address of the relevant function is pushed onto a first stack location of a well known stack of the code executing computing system within which the software application is executing. In a second step, a target address of the relevant function is pushed onto the stack at a second stack location preferably on top of the function return address followed by pushing the hook address onto the stack on top of the function target address. In a third step, return address and target address are exchanged on their stack locations by intermediate use of a CPU register, the original value of which is temporarily stored on the stack. Return, target and hook addresses are memory addresses within the isolated process memory area. Because of the version identifier, only a single hook may be utilized within the isolated process memory area. In a fourth step, execution control is transferred to hook.

The method may be provided by a hooking system that features a hook entry code generation sequence dynamically generating hook entry code including the DLL version identifier and the enhanced hook in receiving communication with hook entry code. The hooking system may include an identification routine for the identification of the relevant references and an exchanger routine for the stack exchanging of the target address with the return address. The hooking system may be part of a virtual operating system, eventually compressed together with the virtual operating system in an executable file. The hooking system may be present with all its components solely in computer memory. A basic configuration of the hooking system may include the dynamically generated hook entry code and the enhanced hook.

BRIEF DESCRIPTION OF THE FIGURES

Prior Art

Prior Art

DETAILED DESCRIPTION

Figure 1:
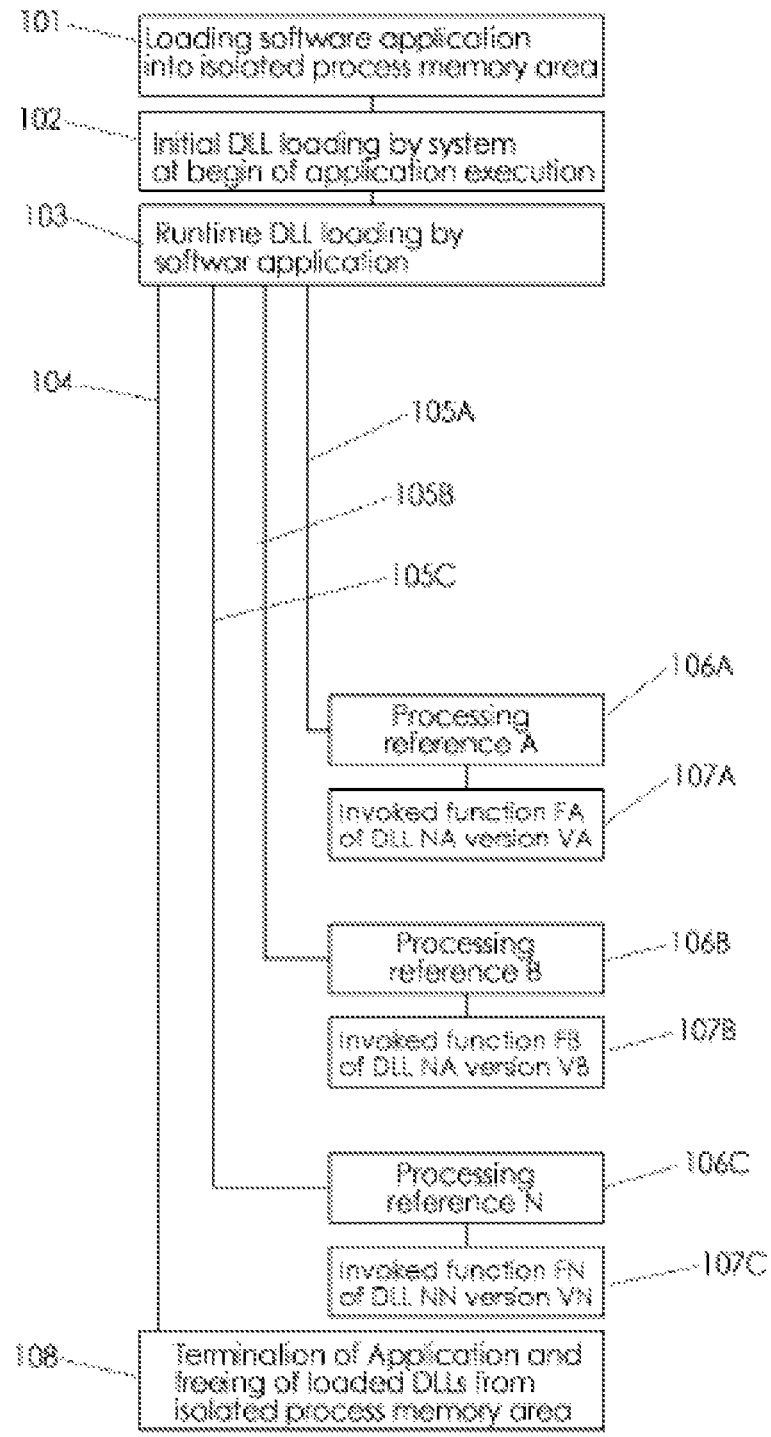
FIG. 1 is a block diagram of a software application executing in isolated process memory area.

Prior Art FIG. 1, depicts step blocks 101-108 of a well known executing software application 100 (see FIGS. 4, 6A, 6B) relevant in the conjunction with the present invention. As may be clear to anyone skilled in the art, the execution of a software application 100 may include additional steps not depicted in the Prior art FIG. 1. During step 101, the software application 100 is loaded into isolated process memory area, which may be defined by the operating system 410 (see FIGS. 6A, 6B) within an available memory space of a code executing computer system such as a personal computer. Functions such as well known system functions that are needed by the software application for its predetermined execution within the operating system 410 may be contained in well known dynamically loaded libraries (DLLs).

During step 102, the operating system 410 performs an initial DLL loading at execution begin of the software application 100. Initially loaded DLLs may remain in isolated process memory area until termination of the software application 100. During runtime of the software application 100, DLLs may also be loaded into the isolated process memory area. At varying times during application runtime as indicated by path 104, references A, B, N may be made by the executing software application as indicated by paths 105A, 105B, 105C. The references A, B, N may reference functions FA, FB, FN contained in DLLs having names NA and NN. At least two DLLs may have an identical name NA but may be of distinct version VA, VB. The processing of the references A, B, N as shown in steps 106A, 106B, 106C invokes the corresponding functions FA, FB, FN as illustrated by blocks 107A, 107B, 107C. All necessary information about DLL names, DLL versions, functions FA, FB, FN names for an unambiguous invocation of the functions FA, FB, FN via references A, B, N may be contained in the code of the software application 100 and/or well known associated data files During termination of the software application 100, the loaded DLLs NA, NN are freed from the isolated memory process memory area as depicted in step 108. Runtime loaded DLLs may be freed also during application runtime 104.

There may be well known cases where the functionality of the software application 100 is to be modified without modification of the software application's 100 code. For that purpose, well known hooking systems have been utilized in the prior art as illustrated in Prior Art FIG. 2. As in step 201, a prior art hooking system may provide for that purpose well known information about relevant functions FA, FB, FN to be hooked and to be replaced by substitute functions X, Y, Z during execution of the software application 100 to accomplish a predetermined modification of the software application's 100 functionality. Well known prior art hooking functions or simply called hooks PH are also provided by prior art hooking systems as shown in block 202. Prior art hooks PH are configured for interpreting DLL names NA, NN and function names FA, FB, FN as is well known in the art.

Identification of relevant references A, B, N is attempted by prior art hooking systems as in block 203. Identification may be attempted during initial DLL loading 102 with an initial screening 205 and during runtime DLL loading 103 with a continuous screening 207. At the moment illustrated in block 209 when a relevant reference A/B/N is identified, it is immediately replaced with a corresponding hook reference RA/RB/RN as depicted by step 211. Consequently, a hook PH of blocks 217A/217B/217C may be invoked instead of functions FA/FB/FN. The invoked hook PH in turn may establish communication with respective substitute functions X, Y, Z of blocks 218A, 218B, 218C. The substitute functions X, Y, Z are intended to provide either independently or in conjunction with respective functions FA, FB, FN the predetermined functionality modification of the software application 100. At application termination 108, the hook PH is also freed from the isolated process memory area. Multiple representations of the hook PH may be employed within the isolated process memory area as is clear to anyone skilled in the art.

Figure 2:
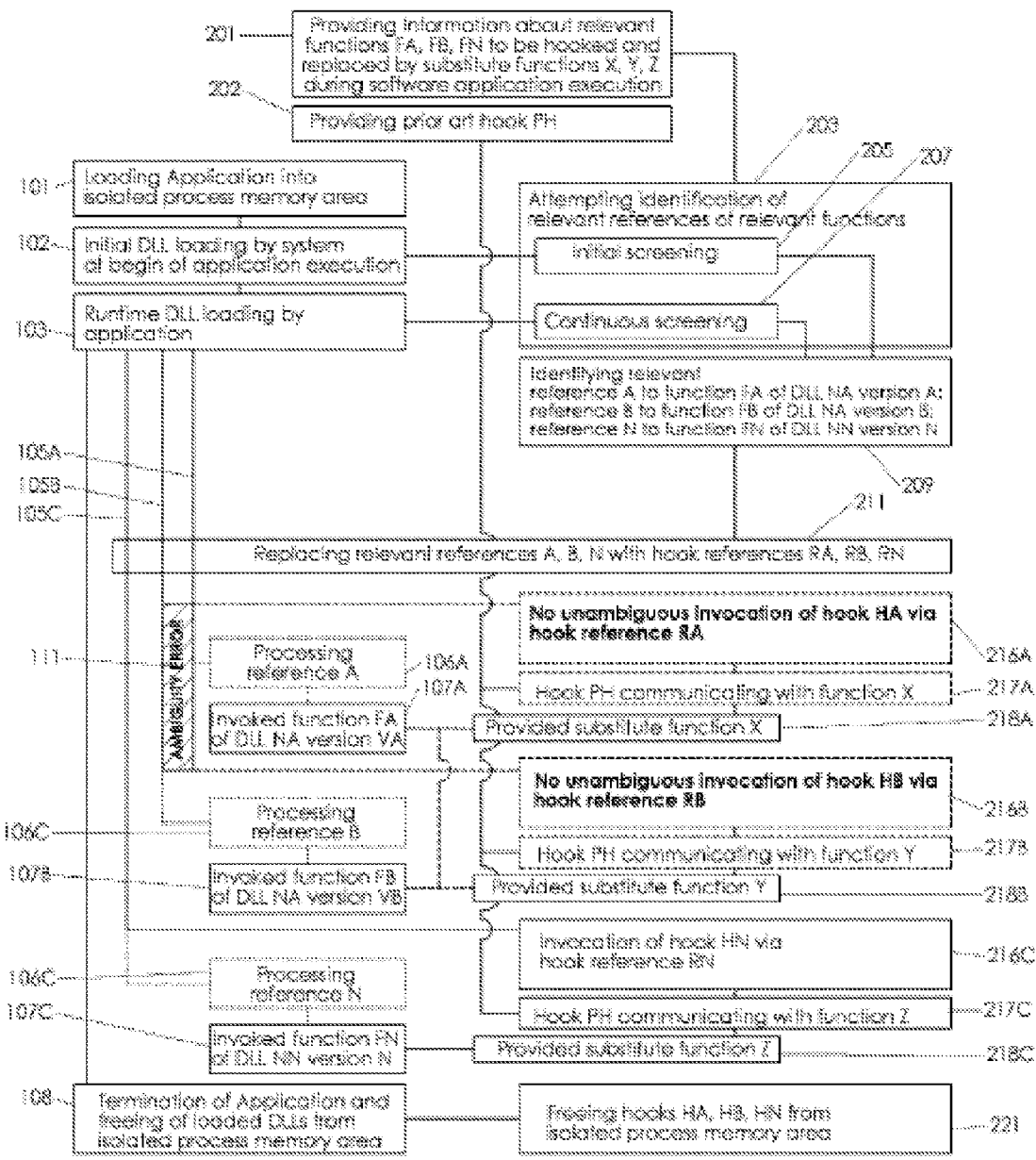
FIG. 2 is a block diagram of the executing software application of Prior Art FIG. 1 partially erroneously hooked by a prior art hooking method.
Figure 3:
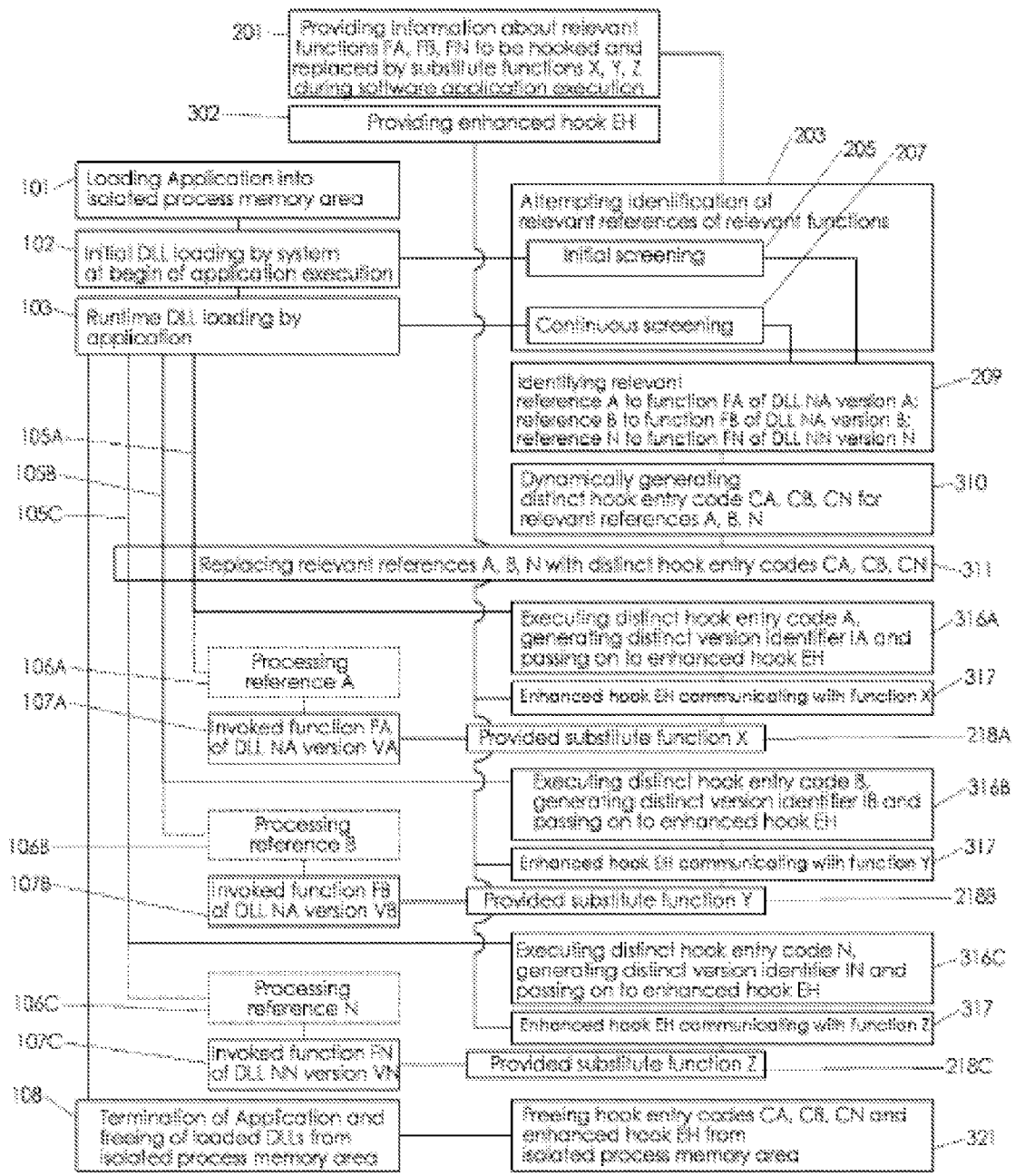
FIG. 3 is a block diagram of the executing software application of Prior Art FIG. 1 hooked by a hooking method of the present invention.

In the case illustrated in Prior Art FIG. 2 and FIG. 3, at least two identically named DLLs NA of distinct version VA, VB are to be hooked. In Prior Art FIG. 2 an ambiguity error 111 may occur in conjunction with prior art hooking systems. The ambiguity error 111 may occur, since hook references RA, RB only recognize DLL names NA, NN and function names FA, FB, FN and are not configured to distinguish between versions VA and VB. As a result, substitute functions X or Y may be invoked via hook PH instead of function FA and function FB. In praxis, functions FA, FB, FN may be a large number. Even functions FA, FB contained in different versions VA, VB of DLLs NA may be in large numbers with only slight and/or occasional functional differences. Consequently, the ambiguity error 111 may remain undetected as long as functionality of function FA and FB differs only insignificantly for the software application's 100 execution. With increasing numbers of identically named multiple version VA, VB DLLs NA simultaneously loaded into isolated process memory area, the likelihood of adverse ambiguity error 111 effects on the software application 100 execution may increase as well.

In the present invention depicted in FIG. 3, and immediately following the step 209 of identifying a relevant reference A/B/N a corresponding distinct hook entry code CA/CB/CN is dynamically generated as shown in step 310. Dynamically generated means in context with the present invention that the hook entry code CA/CB/CN is generated by hook entry code generation sequence 305 (see FIGS. 6, 7A, 7B) during runtime of the software application 100 at the moment a relevant reference A, B, N is identified. The relevant references A/B/N are replaced prior to their execution by the corresponding hook entry code CA/CB/CN in step 311. Generated hook entry code CA, CB, CN may remain in isolated process memory area until termination of the software application as in step 108. Steps 209, 310, 311 are repeated every time a relevant reference A/B/N is identified between execution begin and termination of the software application 100. A consecutive invocation to the corresponding relevant function FA/FB/FN executes the respective hook entry code CA/CBCN, whereby version identifier IA/IB/IN is provided as illustrated in steps 316A, 316B, 316C. The version identifiers IA, IB, IN identify versions VA/VB/VN of DLLs NA, NN. An enhanced hook EH also loaded into the isolated process memory area receives the version identifiers IA, IB, IN together with information about DLL names NA, NN and function names FA, FB, FN and correspondingly establishes communication with provided substitute functions X, Y, Z. At application termination 108, hook entry codes CA, CB, CN and enhanced hook EH are freed from isolated process memory area. Multiple representations of the enhanced hook EH may be loaded into and simultaneously active within the isolated process memory area.

Figure 4:
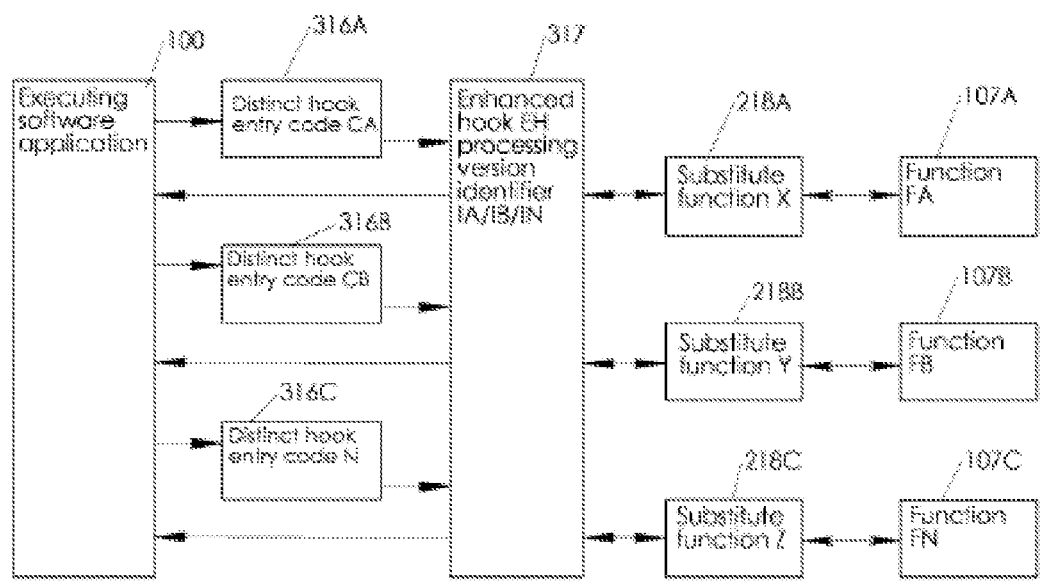
FIG. 4 is a detailed block diagram of an operating hooking system of the present invention.

Communication flow between the executing software application 100, the hook entry codes CA, CB, CN of steps 316A, 31 6B, 316C, the enhanced hook EH of step 317, substitute functions X, Y, Z of steps 218A, 218B, 218C and eventually functions FA, FB, FN of steps 218A, 218B, 218C in accordance with the present invention is depicted in FIG. 4. Communication coming from the executing software application 100 is attributed with distinct version identifiers IA, IB, IN and redirected towards the single enhanced hook EH by the established distinct hook entry codes CA, CB, CN. Communication between enhanced hook EH and respective substitute functions X, Y, Z as well as between substitute functions X, Y, Z and respective functions FA, FB, FN is bidirectional. Communication from the enhanced hook EH to the executing software application 100 may be directly.

Figure 5:
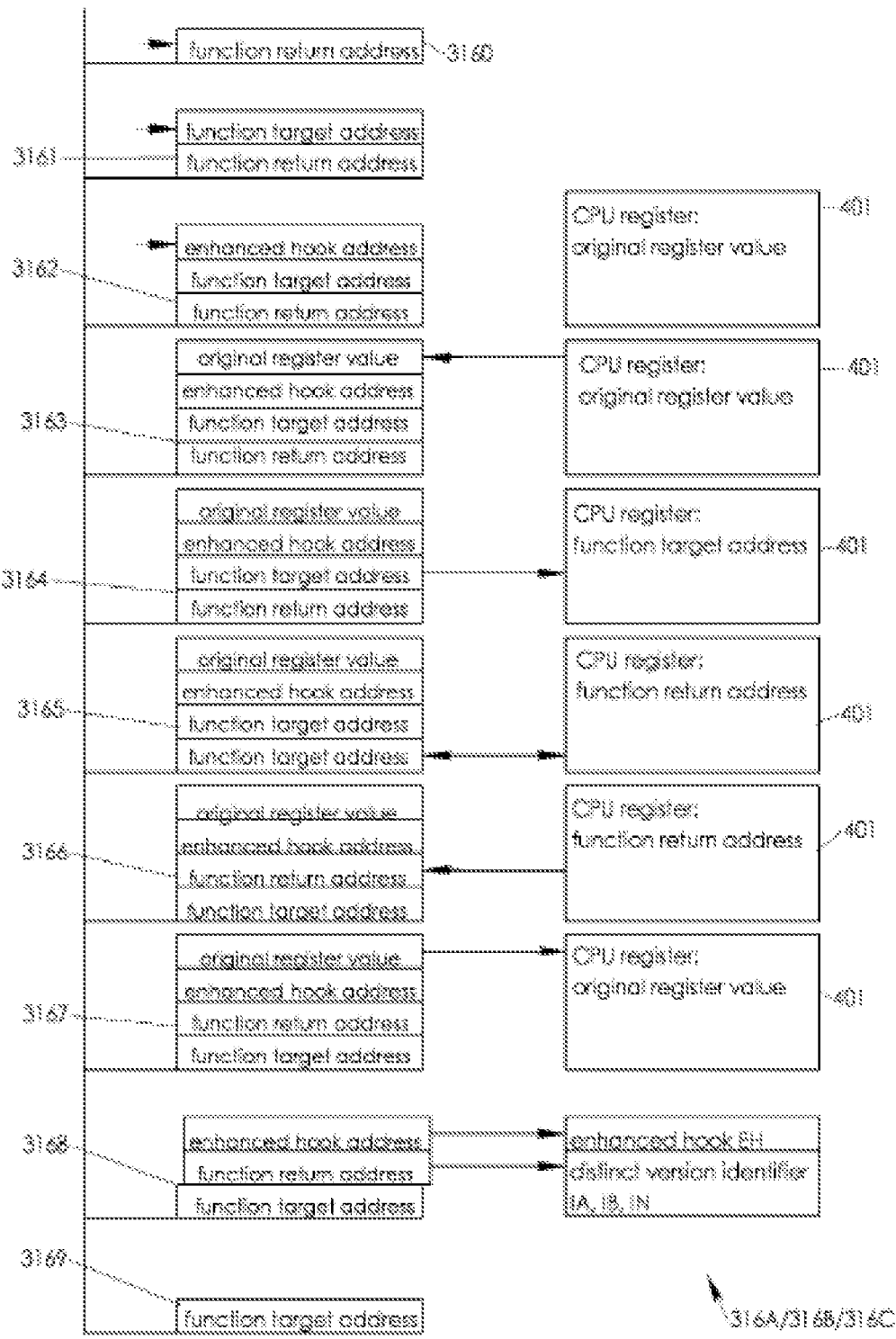
FIG. 5 is a stack activity schematic of the present invention.
Figure 6:
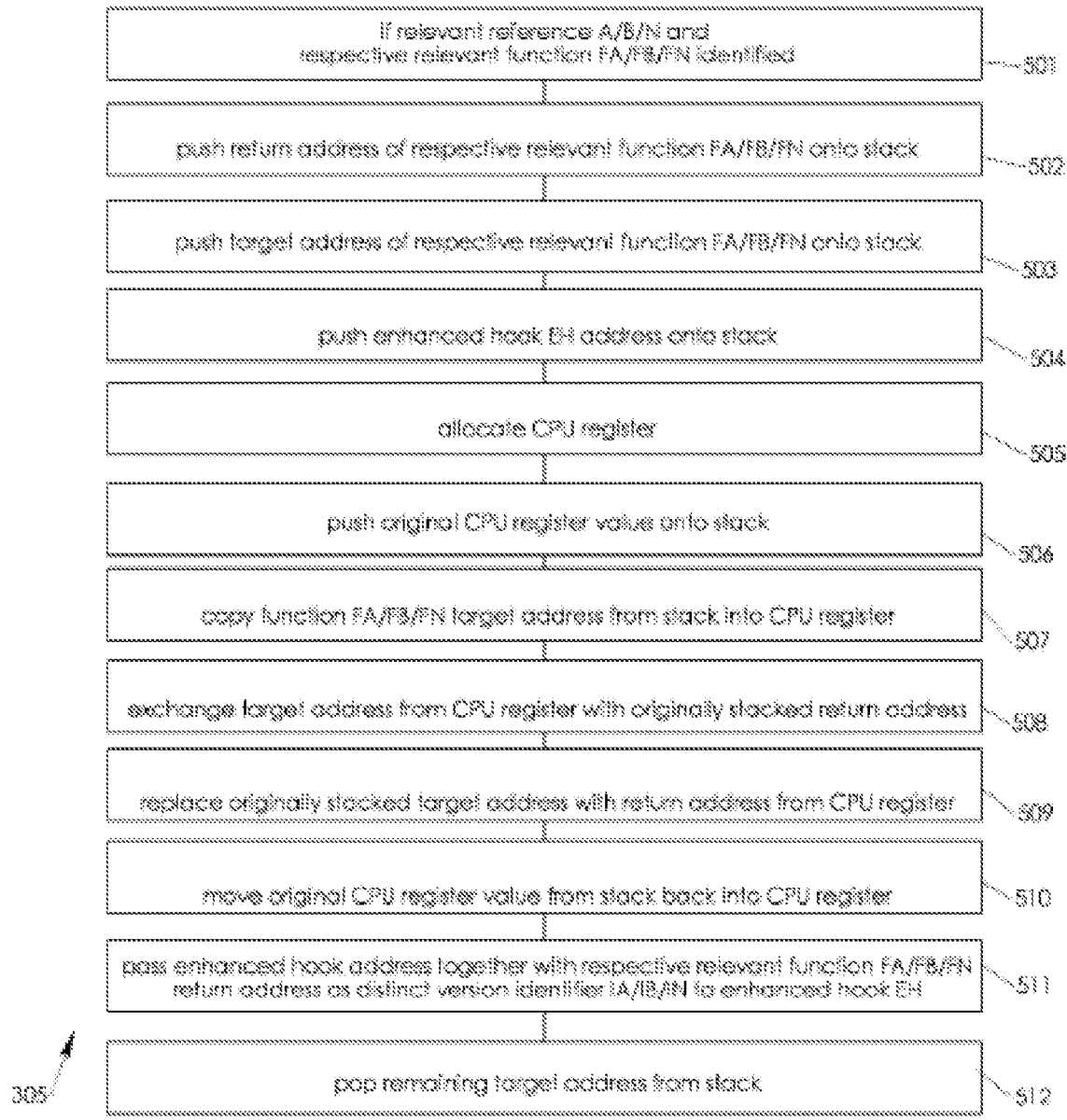
FIG. 6 is a pseudo code block diagram of a hook entry code generation sequence of the present invention.

In FIG. 5, stack blocks 3160-3169 schematically depict activity on a well known stack of the code executing computing system 400 during the dynamic generation of distinct hook entry codes CA, CB, CN. The bottom to top loaded stack blocks 3160-3169 are presented for the sole purpose of general understanding without claim of accuracy. Notably, commonly practiced top down depiction of stack loading activity in well known Intel™ based hardware architectures that may provide the code executing computing system 400 is disregarded in the FIG. 5. A pseudo code listing of code blocks 501-511 of the hook entry code generation sequence 305 is shown in FIG. 6. The hook entry code generation sequence 305 dynamically generates hook entry codes CA, CB, CN for each identified relevant reference A, B, N. The hook entry codes CA, CB, CN remain loaded in the isolated process memory area during runtime of the software application 100. The hook entry codes CA, CB, CN are representations of the hook entry code generation sequence 305 adapted to the individual relevant references AB/N, individual respective relevant functions FA/FB/FN, individual respective DLLs NA of version VA/VB/VN, individual respective enhanced hook(s) EH and individual respective predetermined substitute functions X/Y/Z as may be clear to anyone skilled in the art.

In case a relevant reference AIBIN and its respective relevant function FA/FB/FN is identified as in code block 501, a return address of the respective relevant function FA/FB/FN is instructed by code block 502 to be pushed onto a first stack location of the stack as in stack block 3160 followed by instruction of code block 503 to push a target address of the respective relevant function FA/FB/FN onto a second stack location of the stack as in stack block 3161. Then an address of the enhanced hook EH is instructed by code block 504 to be pushed on the stack as in stack block 3162. A well known CPU register 401 is allocated as instructed by code block 505. According to code block 506, the CPU register's 401 original value is stored on the stack as in stack block 3163. Once the original CPU register 401 value is stored on the stack, the function's FA/FB/FN target address is instructed by code block 507 to be loaded from the second stack location into the allocated CPU register 401. The stack contents remain unaltered as shown in blocks 3163 and 3164. Next, originally stacked return address at the first stack location and target address in the CPU register 401 are instructed by code block 508 to be preferably simultaneously exchanged as in stack block 3165, or in other words exchanging the CPU register contents with the first stack location. Next, code block 509 instructs to replace the original target address at the second stack location with the return address contained in the CPU register 401 as in stack block 3166, or in other words storing the CPU register content to the second stack location. Between 3160 and 3166 the return address is in fact exchanged with the target address at their respective stack location. Code blocks 502-510 are an exchanger routine, which is part of the hook entry code generation sequence 305. Once the original register value is loaded back into the CPU register as in block 3167 and as instructed by code block 510, the enhanced hook EH address is passed on together with the function return address to the enhanced hook EH as in block 3168 and as instructed by code block 511. The function return address is utilized as distinct version identifier IA, IB, IN. The remaining function FA/FB/FN target address in block 3169 may be cleared from the stack according to code block 512. Each of the steps between blocks 3160-3169 takes about one well known CPU clocking interval.

Figure 7A:
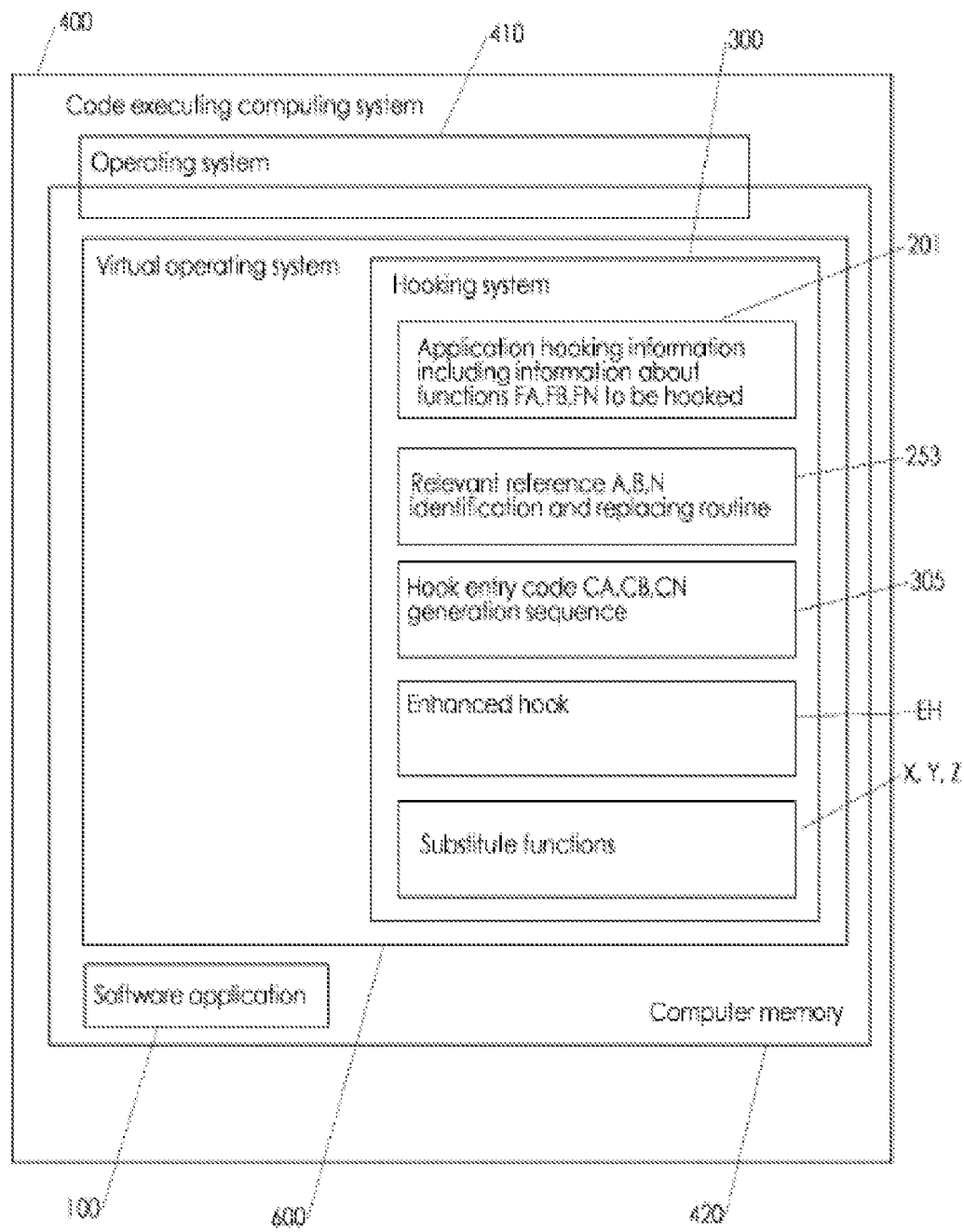
FIGS. 7A, 7B schematically depict representative configurations of hooking systems in accordance with embodiments of the present invention.
Figure 7B:
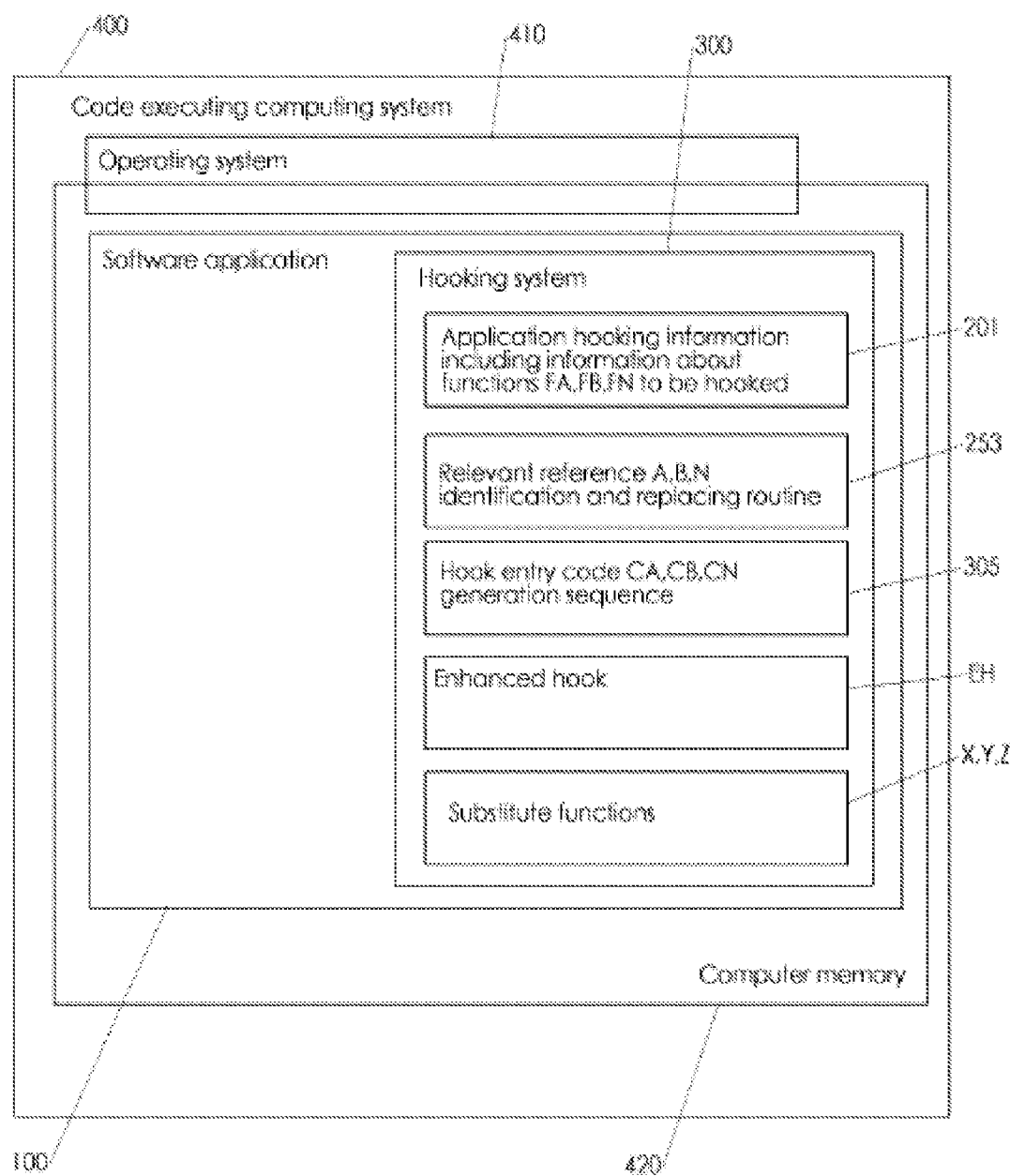

Referring to FIG. 7A, the hooking system 300 of the present invention may include a well known application hooking information 201 including information about functions FA, FB, FN to be hooked, a well known relevant reference A, B, N identification and replacing routine 253, the hook entry code generation sequence 305, one or more enhanced hooks EH and substitute function(s) X, Y, Z. The hooking system 300 may be part of a well known virtual operating system 600 that may exist together with the software application 100 in computer memory 420 of the code executing computing system 400. A hard stored operating system 410 may at least partially coexist together with the virtual operating system 600 in computer memory 420. The hooking system 305 may be compressed together with virtual operating system in an executable file. Alternately and as illustrated in FIG. 7B, the hooking system 300 may be embedded within the software application 100.

The hooking system 305 may operate automatically without particular user input to provide functionality modification(s) to the software application 100 as predetermined by a software developing person and as may be well appreciated by anyone skilled in the art in accordance with the above teachings. Accordingly, the scope of the invention described in the Figures and Specification above is set forth by the following claims and their legal equivalent:

The invention claimed is:

1. A method, comprising:
identifying a reference that references a version of a function, the version of the function belonging to a version of a dynamically loaded library (DLL) from a plurality of versions of the DLL loaded into a memory area;

dynamically generating a hook-entry code associated with the version of the function; and replacing the reference with the hook-entry code, wherein execution of the hook-entry code is configured to provide a version identifier in response to receiving a return address associated with the reference, the version identifier being configured to uniquely identify the version of the DLL, and wherein an enhanced hook is configured to identify the version of the DLL in response to receiving the version identifier from the hook-entry code.

2. The method of claim 1, wherein execution of the hook-entry code is further configured to provide an address of the enhanced hook.

3. The method of claim 1, wherein the version identifier is the return address associated with the reference.

4. The method of claim 1, wherein the hook-entry code includes instructions to:

push the return address of the version of the function onto a first stack location of a stack;

push a target address of the version of the function onto a second stack location of the stack;

push an address of the enhanced hook onto a third stack location of the stack;

allocate a CPU register, the CPU register having an original register value;

push the original register value onto a fourth stack location on the stack;

load the target address of the version of the function into the CPU register;

exchange the target address of the version of the function located in the CPU register with the return address of the version of the function located in the first stack location;

replace the target address of the version of the function located in the second stack location with the return address of the version of the function located in the CPU register;

load the original register value located in the fourth stack location into the CPU register; and return the enhanced hook address together with the return address of the version of the function.

5. The method of claim 4, wherein the instructions of the hook-entry code are executed in a CPU clocking interval.

6. The method of claim 1, wherein the method is performed during execution of a software application.

7. One or more non-transitory computer-readable media persistently storing a program, wherein the program, when executed, instructs a processor to perform the following operations:

identifying a reference that references a version of a function, the version of the function belonging to a version of a dynamically loaded library (DLL) from a plurality of versions of the DLL loaded into a memory area;

dynamically generating a hook-entry code associated with the version of the function; and replacing the reference with the first hook-entry code, wherein execution of the first hook-entry code is configured to provide a version identifier in response to receiving a return address associated with the reference, the version identifier being configured to uniquely identify the version of the DLL, and wherein an enhanced hook is configured to identify the version of the DLL in response to receiving the version identifier from the hook-entry code.

8. The non-transitory computer-readable media of claim 7, wherein execution of the hook-entry code is further configured to provide an address of the enhanced hook.

9. The non-transitory computer-readable media of claim 7, wherein the version identifier is the return address associated with the reference.

10. The non-transitory computer-readable media of claim 7, wherein the hook-entry code includes instructions to:

push the return address of the version of the function onto a first stack location of a stack;

push a target address of the version of the function onto a second stack location of the stack;

push an address of the enhanced hook onto a third stack location of the stack;

allocate a CPU register, the CPU register having an original register value;

push the original register value onto a fourth stack location on the stack;

load the target address of the version of the function into the CPU register;

exchange the target address of the version of the function located in the CPU register with the return address of the version of the function located in the first stack location;

replace the target address of the version of the function located in the second stack location with the return address of the version of the function located in the CPU register;

load the original register value located in the fourth stack location into the CPU register; and return the enhanced hook address together with the return address of the version of the function.

11. The non-transitory computer-readable media of claim 10, wherein the instructions of the hook-entry code are executed in a CPU clocking interval.

12. The non-transitory computer-readable media of claim 7, wherein the method is performed during execution of a software application.

13. A computing system comprising:

a memory;

a module stored on the memory that is configured, when executed, to:

identify a reference that references a version of a function, the version of the function belonging to a version of a dynamically loaded library (DLL) from a plurality of versions of the DLL loaded into a memory area;

dynamically generate a hook-entry code associated with the version of the function; and replace the reference with the hook-entry code, wherein execution of the hook-entry code is configured to provide a version identifier in response to receiving a return address associated with the reference, the version identifier being configured to uniquely identify the version of the DLL, and wherein an enhanced hook configured to identify the version of the DLL in response to receiving the version identifier form the hook code.

14. The computing system of claim 13, wherein execution of the first hook-entry code is further configured to provide an address of the enhanced hook.

15. The computing system of claim 13, wherein the version identifier is the return address associated with the reference.

16. The computing system of claim 13, wherein the hook-entry code includes instructions to:

push the return address of the version of the function onto a first stack location of a stack;

push a target address of the version of the function onto a second stack location of the stack;

push an address of the enhanced hook onto a third stack location of the stack;
allocate a CPU register, the CPU register having an original register value;
push the original register value onto a fourth stack location on the stack;
load the target address of the version of the function into the CPU register;
exchange the target address of the version of the function located in the CPU register with the return address of the version of the function located in the first stack location;
replace the target address of the version of the function located in the second stack location with the return address of the version of the function located in the CPU register;
load the original register value located in the fourth stack location into the CPU register; and
return the enhanced hook address together with the return address of the version of the function.

17. The computing system of claim 16, wherein the instructions of the first hook-entry code are executed in a CPU clocking interval.

* * * * *